(12) United States Patent
Sayama

(10) Patent No.: US 9,132,749 B2
(45) Date of Patent: Sep. 15, 2015

(54) LATCHING DEVICE

(75) Inventor: Tatsuo Sayama, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 18 days.

(21) Appl. No.: 14/119,668

(22) PCT Filed: Jun. 11, 2012

(86) PCT No.: PCT/JP2012/064894
§ 371 (c)(1),
(2), (4) Date: Nov. 22, 2013

(87) PCT Pub. No.: WO2012/173083
PCT Pub. Date: Dec. 20, 2012

(65) Prior Publication Data
US 2014/0091195 A1   Apr. 3, 2014

(30) Foreign Application Priority Data
Jun. 17, 2011 (JP) ................................. 2011-135620

(51) Int. Cl.
*F16M 13/00* (2006.01)
*B60N 2/015* (2006.01)

(52) U.S. Cl.
CPC .................................. *B60N 2/01583* (2013.01)

(58) Field of Classification Search
CPC .... B60N 2/01583; B60N 2/22; B60N 2/0232; B60N 2/20; B60N 2/233
See application file for complete search history.

(56) References Cited

U.S. PATENT DOCUMENTS

| | | | |
|---|---|---|---|
| 6,945,585 B1 * | 9/2005 | Liu et al. | 296/65.03 |
| 7,762,605 B2 * | 7/2010 | Otsuka et al. | 296/65.03 |
| 2007/0152484 A1 * | 7/2007 | Palomba et al. | 297/336 |
| 2010/0026013 A1 * | 2/2010 | Otsuka et al. | 292/121 |
| 2014/0091195 A1 * | 4/2014 | Sayama | 248/503.1 |

FOREIGN PATENT DOCUMENTS

| | | |
|---|---|---|
| JP | 2010-274879 | 12/2010 |
| JP | 2011-068262 | 4/2011 |

* cited by examiner

*Primary Examiner* — Amy Sterling
(74) *Attorney, Agent, or Firm* — Hamre, Schumann, Mueller & Larson, P.C.

(57) ABSTRACT

A first link (20) rotatably supported at a base member (10) of which a rotational motion is imparted by a pull member (e.g., wire 70), a second link (30) rotatably supported at the base member (10), a latch (40) including a hook-like portion (43) engageable with a rod-like portion (91), and a transmission mechanism (actuating lever 50) configured to transmit a rotational motion of the second link (30) to the latch (40) and to cause the latch to make a rotational motion are included. The first link (20) has a first action surface (24A) and a second action surface (25). The pulling operation made by the pull member (70) causes the first action surface (24A) to push a contact surface (33A), causing the second link (30) to make a rotational motion, and causes a surface of the first link (20) in contact with the second link (30) to be switched, partway through the pulling operation made by the pull member (70), from the first action surface (24A) to the second action surface (25).

16 Claims, 8 Drawing Sheets

LATCHING DEVICE

TECHNICAL FIELD

The present invention relates to a latching device for use in fastening a vehicle seat or the like.

BACKGROUND ART

In general, a seat installed rotatably with respect to a vehicle body includes a latching device provided on a leg thereof or the like, and is fastened to the vehicle body by this latching device being engaged with a striker fixed to the vehicle body. A lever for operating the latching device is provided in an appropriate position separate from the latching device for user's convenience of operation, and a pull member such as a wire or a rod is provided between the lever and the latching device, so that the operation of the lever is transmitted to the latching device via the pull member.

Among examples of such a latching device is a latching device developed by the inventor of this application, as described for example in JP 2011-068262 A. This latching device is configured such that a latch engageable with a striker is operable by a latchet, an open lever and an actuating lever, and a wire is engaged with the open lever. Latching/unlatching is done by pulling the wire using the lever or the like located in a position separate from the latching device.

In the latching device configured as described above, the open lever once pulled via the wire makes a rotational motion which is transmitted to the latchet via an actuating arm of the latchet engaged with a groove provided in the open lever. However, the actuating arm of the latchet is retained in engagement with the groove of the open lever before the wire is pulled until the wire has been pulled to the full stroke and thereafter; therefore, there is a possibility that the wire is pulled even under the full-open latch state in which the latch cannot turn any more, and if the wire is pulled hard, an excessive load would be imposed on the latching mechanism, thus requiring a careful consideration to the design of the latch mechanism.

In order to prevent the so-called over-stroke pulling operation which means that a wire is pulled beyond its limit and the wire is held under a great tension, it is customary to make a difference between the length of the wire which can be pulled in the latching mechanism and the length of the wire which can be pulled by the operation of the lever provided for manual operation. However, because the latching device also needs to be designed compactly, it is difficult to ensure that an extra length of the wire (this will be referred to "pull length allowance" in this description) which can be pulled at the manual operation side is provided sufficiently at the latching device side.

SUMMARY OF INVENTION

The present invention is created in view of the above-described background. It is one aspect of the present invention to provide a latching device which has an increased pull length allowance so as to suppress the over-stroke pulling operation. Other aspects of the present invention are also disclosed herein which fulfill one or more of various requirements in design (e.g., miniaturization, weight reduction, sufficiently ensured strength/rigidity/durability, good operating feel, etc.) for the latching device.

More specifically, according to one embodiment of the present invention, there is provided a latching device capable of disengaging from a rod-like portion in response to a pulling operation by a pull member, which latching device comprises: a base member; a first link which is supported at the base member in a rotatable manner and of which a rotational motion is imparted by the pull member; a second link which is supported at the base member in a manner that permits the second link to rotate about an axis parallel to an axis of rotation of the first link; a latch including a hook-like portion engageable with the rod-like portion; and a transmission mechanism configured to transmit a rotational motion of the second link to the latch and, to cause the latch to make a rotational motion. The first link has a first action surface and a second action surface. The second link has a contact surface disposed to face the first action surface before the pulling operation made by the pull member. The pulling operation made by the pull member causes the first action surface to push the contact surface, causing the second link to make a rotational motion, and causes a surface of the first link in contact with the second link to be switched, partway through the pulling operation made by the pull member, from the first action surface to the second action surface. With this configuration, the amount of actuation of the latch to be effected by an amount of pulling operation of the pull member can be changed between the first and second periods of the pulling operation, and thus an improvement can be achieved in ensuring the pull length allowance while various requirements in design are fulfilled.

For example, it may be possible to implement a configuration such that the first action surface extends in a direction away from the axis of rotation of the first link, and the second action surface is provided continuously with the first action surface and extends in a direction following a circumference of a circle drawn around the axis of rotation of the first link. The latching device configured in this way is such that at a time of activation when the pulling operation is started, the first action surface of the first link is brought into contact with the contact surface of the second link so that the second link is rotated. In this operation, the rotation of the first link can be transmitted to the second link efficiently because the first action surface extends in a direction away from the axis of rotation of the first link. In other words, the amount of rotation of the second link to be effected by an amount of rotation of the first link is relatively great.

As the amount of pulling operation of the pull member increases, the contact of the first link with the contact surface is switched partway from the first action surface to the second action surface. Thereafter, the second link is rotated very little even when the first link is rotated because the second action surface extends in a direction following a circumference of a circle drawn around the axis of rotation of the first link. As a result of very little rotation of the second link, during a period of time when the second action surface is in contact with the contact surface of the second link, the latch is moved very little no matter how much the pull member is pulled. In this way, the latching device according to the present invention is configured such that the latch is actuated efficiently during the first period of the pulling operation of the pull member, while the latch is actuated very little during the second period of the pulling operation of the pull member; thus, by making use of this second period, the pull length allowance of the pull member can be increased. Accordingly, the over-stroke pulling operation of the pull member can be suppressed.

The above-described latching device may further comprise a biasing member configured to bias the second link, and be configured such that a direction from the second action surface toward a center of curvature of the second action surface is shifted to one side with respect to the axis of rotation, whereby a force received by the second action surface from the second link biased by the biasing member acts as a force which drives the first link to rotate toward a position in which the first link has been located before the pulling operation made by the pull member.

With this configuration, the direction from the second action surface toward the center of curvature of the second action surface is not the direction toward the axis of rotation of the first link but shifted to some extent from that axis of rotation, and thus when a force is applied from the contact surface to the second action surface by the spring biasing force or the force acting on the latch, the first link can be moved back to the position in which it has been located before the pulling operation made by the pull member.

The above-described latching device may be configured such that the first link has an opposed surface which faces the first action surface, and has a groove made by the first action surface and the opposed surface, wherein the second link includes an operating arm having the contact surface, and the operating arm is configured to be in the groove before the pulling operation made by the pull member, and to disengage from the groove after a predetermined amount of the pulling operation made for the pull member.

As the first link has the opposed surface which faces the first action surface, the play between the first link and the second link in engagement can be reduced, so that noises can be reduced. Moreover, when the second link tends to move back to a position in which it has been located before actuation, the first link may be driven to move back to the position in which it has been located before actuation.

In the above-described latching device, the first link may preferably be made of resin. By providing the first link made of resin, its slidability with the base member and the second link are increased, so that noises can be suppressed.

In the above-described latching device, back sides of the first action surface and the second action surface may preferably be trimmed.

If the back sides of the first action surface and the second action surface are trimmed, light-weight configuration can be achieved, and a sink which would appear in portions corresponding to the first and second action surfaces due to shrinkage during the molding process can be prevented, so that the first and second action surfaces can be formed with high accuracy.

In the above-described latching device, the first link may preferably have a bearing hole at which the rotational motion of the first link is supported, such that a bearing portion surrounding the bearing hole has a size in an axial direction greater than those of portions which form the first action surface and the second action surface.

With this configuration, the rigidity of the bearing portion can be ensured sufficiently, and the portions corresponding to the first and second action surfaces can be made lighter in weight, so that the weight as a whole can be reduced.

The latching device in which the first link has a groove and the second link includes an operating arm may further comprise a biasing member configured to bias the second link, and be configured such that the operating arm includes a pin which is provided at an end thereof and with which one end of the biasing member is engaged, and before the pulling operation made by the pull member an axis of the pin is located, as viewed in a direction of the axis of rotation of the first link, at an inside of the groove with respect to a straight line that connects ends of the opposed surface and the first action surface which ends define edges of the groove. With this configuration, the biasing force of the biasing member applied to the pin can be transmitted to the first link efficiently at the first action surface, and the latching device as a whole can be designed to be compact in size.

The above-described latching device which comprises a biasing member configured to bias the second link may be configured such that before the pulling operation made by the pull member the first link and the biasing member are located in such positions that one extends over at least a part of another with respect to a direction in which the base member disengages from the rod-like portion. With this configuration, the device can be miniaturized particularly in the direction in which the based member disengages from the rod-like portion (the upward-downward direction in an illustrative embodiment which will be described later).

The latching device in which the first link has a groove and the second link includes an operating arm may be configured such that before the pulling operation made by the pull member the groove is located so as to extend over a straight line that connects an axis of the rod-like member and the axis of rotation of the first link, as viewed in a direction of the axis of rotation of the first link. With this configuration, the device can be miniaturization particularly in the direction in which the hook-like portion of the latch disengages from the rod-like portion (the leftward-rightward direction in an illustrative embodiment which will be described later).

The above-described latching device may be configured such that the first link has a wire threading slot which allows the pull member to thread therethrough for engagement with the first link, wherein before the pulling operation made by the pull member the wire threading slot is located to face a wall of the base member. With this configuration, the wire threading slot through which the pull member (wire) is threaded to establish engagement is covered with the wall of the base member and closed before the pulling operation made by the pull member, and thus the risk of slipping off of the pull member coming loose due to a shock given from outside or the like can be reduced considerably.

The latching device in which the first link has a groove and the second link includes an operating arm and which further comprises a biasing member configured to bias the second link which biasing member having a first end portion and a second end portion may be configured such that the first end portion is engaged with the operating arm, and the second end portion is engaged with the transmission mechanism, wherein before the pulling operation made by the pull member the first end portion is located in a position shifted from the second end portion toward a direction in which the base member disengages from the rod-like portion. With this configuration as well, upsizing of the device can be suppressed.

The above-described latching device which further comprises a biasing member configured to bias the second link may be configured such that after the pulling operation made by the pull member the second action surface of the first link and the biasing member are located in such positions that one extends over another, as viewed in a direction of the axis of rotation of the first link. With this configuration as well, upsizing of the device can be suppressed.

DESCRIPTION OF EMBODIMENTS

Figure 1:
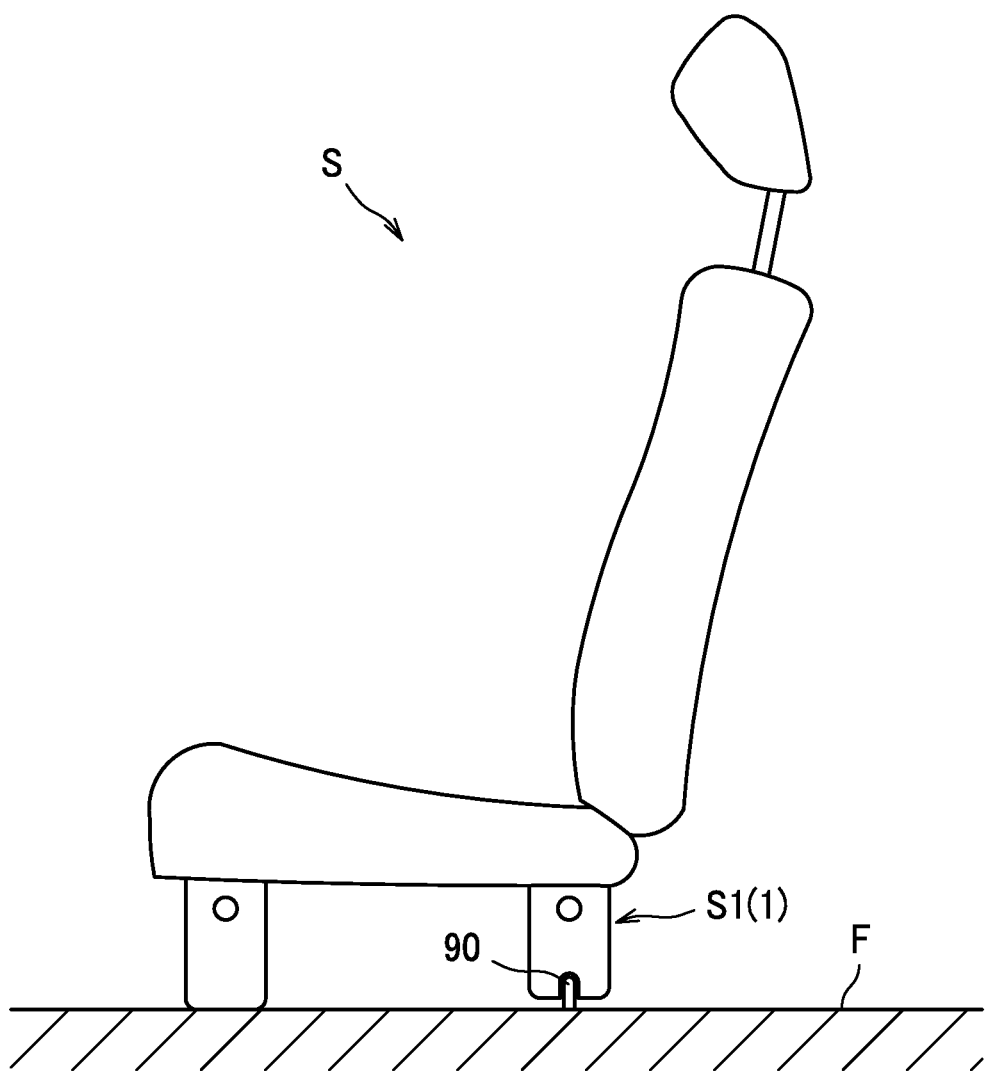
FIG. 1 is a side elevation of a vehicle seat provided with a latching device.

Hereafter, a description will be given of one embodiment of a latching device according to the present invention with reference to the drawings. The latching device according to one embodiment is provided, for example as shown in FIG. 1, in a leg S1 of a vehicle seat S for an automobile or the like. As one example, the leg S1 shown herein is the very embodiment of the latching device 1. The latching device 1 is configured to fix the vehicle seat S to a floor F by engaging with a striker 90 fixed on the floor F of the vehicle, and to release the vehicle seat S from the floor F by disengaging from the striker 90.

Figure 2:
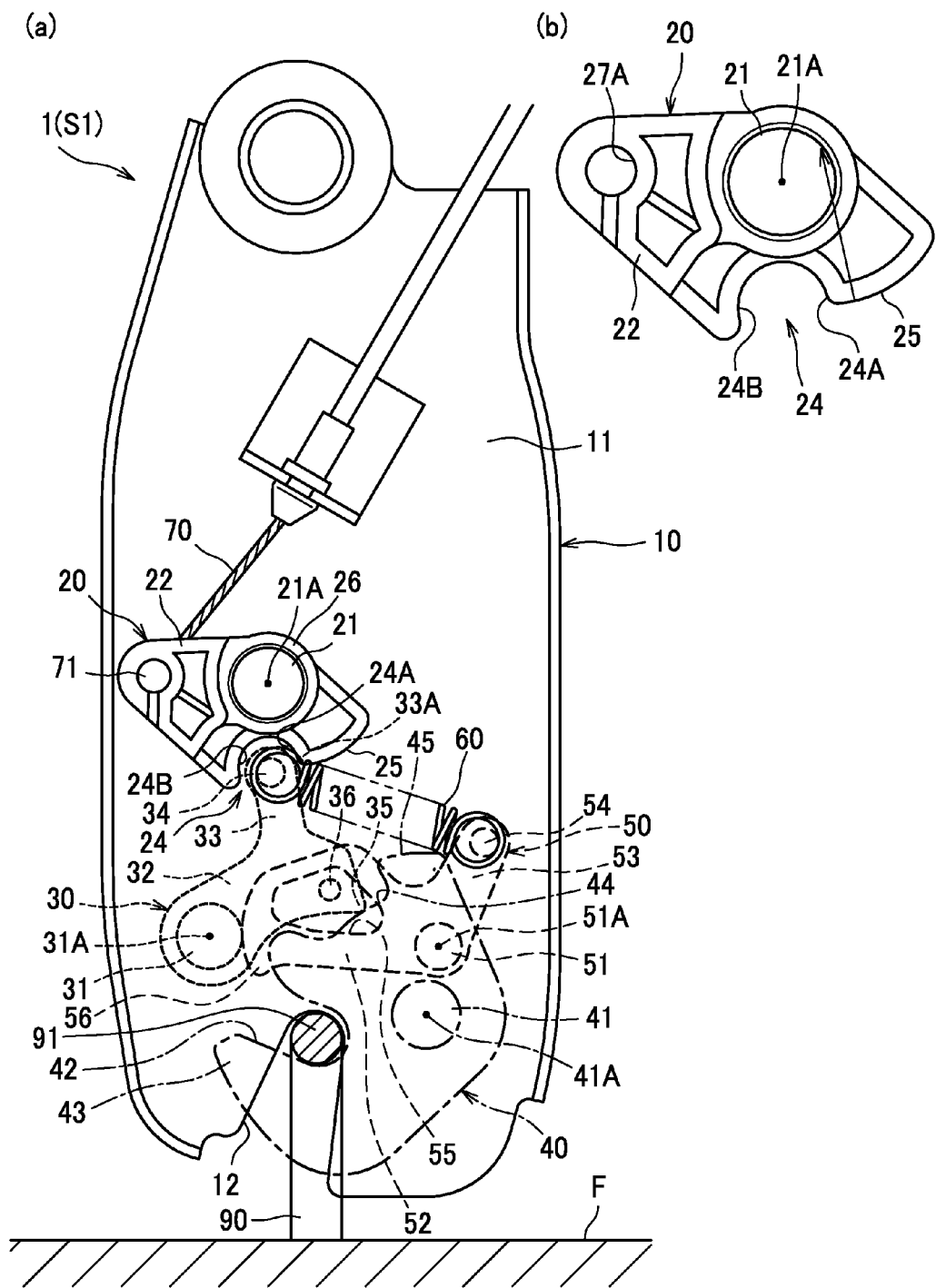
FIG. 2 includes (a) a diagram showing a structure of the latching device in a locked state, and (b) an enlarged view of a first link.

As shown in FIG. 2(a), the latching device 1 mainly includes a base member 10, a first link 20, a second link 30, a latch 40, and an actuating lever 50, and is configured to be actuated by a rotational motion of the first link 20 made in response to a pulling operation of a wire 70 as one example of a pull member. In the following description, the terms of upper, lower, left and right in FIG. 2(a) are referred to for convenience in explanation; it is however to be understood that the latching device 1 can be used in any orientation. To facilitate understanding, the first link 20, the second link 30, the latch 40 and the actuating lever 50 in the drawings are drawn by different line types.

The base member 10 is an elongate plate-like member formed by stamping sheet metal, which in the present embodiment also serves as a structural part of the leg S1 of the vehicle seat S. The base member 10 comprises a plate-like base portion 11 having holes (though not illustrated in the drawing) formed therein for use in mounting the first link 20, the second link 30 and the latch 40. A lower end of the base member 10 has a slit 12 provided which opens downward. The slit 12 is a guide through which a rod-like portion 91 is disposed therein, and also is a portion which serves to contact the striker 90 at its bottom (upper end) to support the load from the vehicle seat S through the striker 90. The left and right end portions of the base member 10 are bent along the whole length to form flange-like wall portions.

Figure 4:
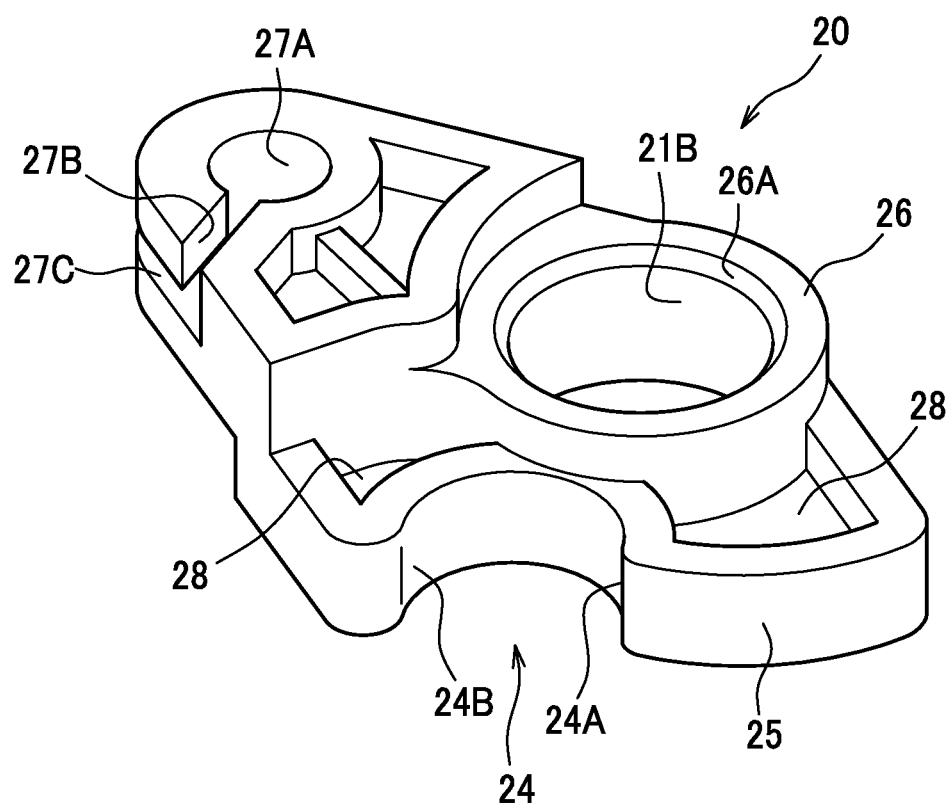
FIG. 4 is an enlarged perspective view of the first link.

The first link 20 is a part which serves as a starting point of the operation of the latching device 1 as activated through the wire 70. The first link 20 is supported at the base member 10 by caulking with a rivet 21. With this, the first link 20 is rendered rotatable about an axis 21A of rotation that is perpendicular to the base portion 11 of the base member 10. The first link 20 includes an arm 22 extending leftward from the axis 21A of rotation, and a groove 24 which is provided at a lower end thereof and opens downward. As shown in FIG. 4 in detail, the first link 20 has a bearing hole 21B in which the rivet 21 is inserted, and the bearing hole 21B is surrounded by a cylindrical bearing portion 26. At an edge of the bearing hole 21B, a chamfer 26A is formed, which makes insertion of the rivet 21 easier. The arm 22 has formed therein a ball hole 27A in which an engaging ball 71 provided at an end of the wire 70 is inserted, a wire insertion slit 27B which extends from the ball hall 27A and opens sideward, and a wire threading slot 27C which connects to an open end of the wire insertion slit 27B and opens at a center in the thickness direction, extending along a plane perpendicular to the axis 21. By making use of this wire insertion slit 27B, the engaging ball 71 of the wire 70 is engaged in the ball hole 27A as shown in FIG. 2(a).

Figure 6:
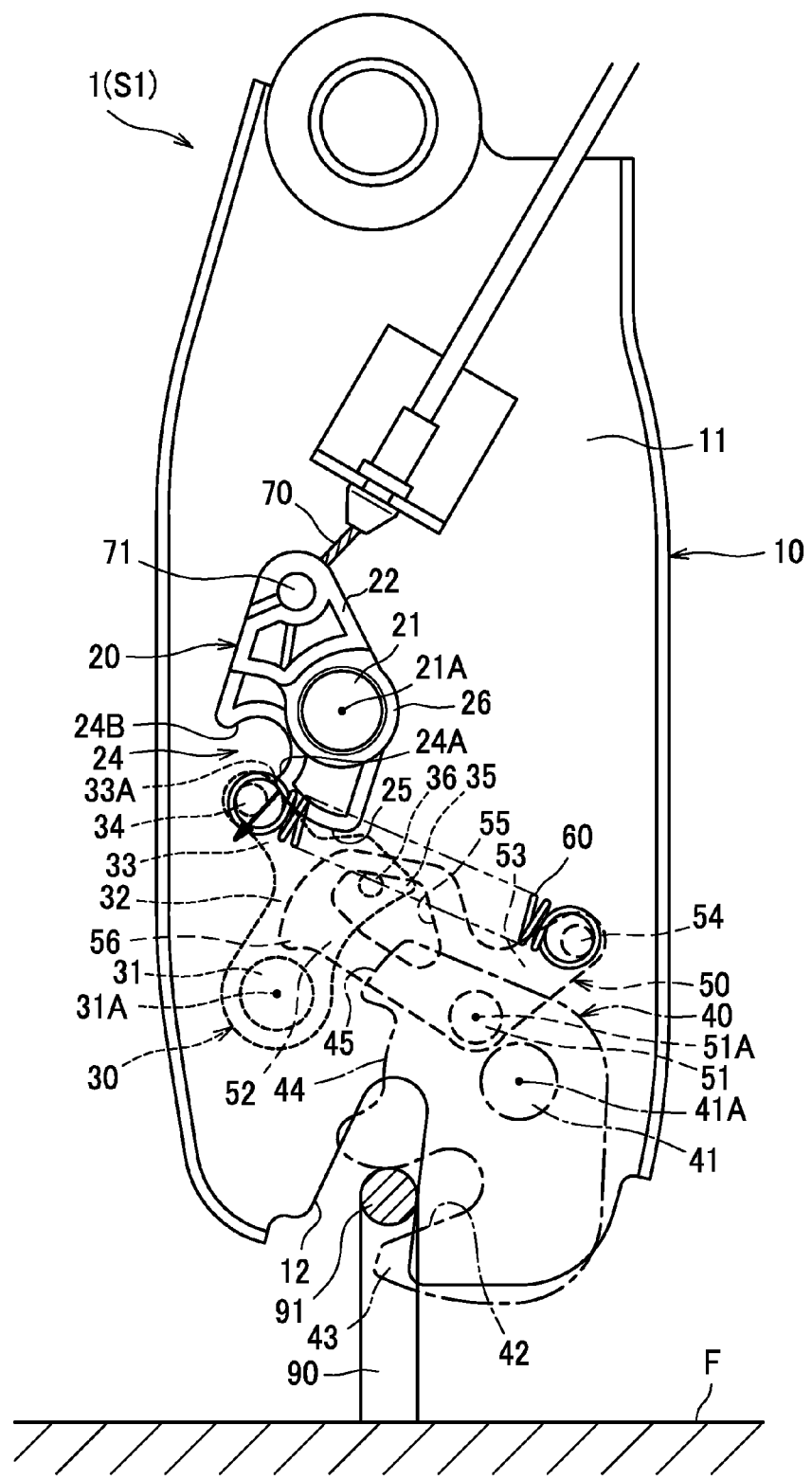
FIG. 6 is a diagram showing a state in which a further pulling operation of the wire is causing the second action surface to contact with and slide on the operating arm.

The wire threading slot 27B in a position before actuation as shown in FIG. 2(a) opens in a downward direction that is substantially opposite to the direction in which the wire 70 extends, and thus the wire is allowed to move within the range of angular motion (approximately 60 degree range; see FIG. 2(a) and FIG. 6) of the first link 20 freely through the wire threading slot 27C but restrained from reaching the wire insertion slit 27B. This means that the wire 70 is prevented from coming off the first link 20 during actuation. Furthermore, as shown in FIG. 2(a), the wire threading slot 27C in a state before the pulling operation made by the wire 70 is located to face the left wall portion of the base member S1; therefore, even if the wire 70 would come loose, it is blocked by the wall portion of the base member S1 disposed so closely as to cover the left end of the wire threading slot 27C, so that the wire 70 will not come off the first link 20.

The first link 20 is made of resin, and thus its sliding motion with the base member 10 and the second link 30 is made smooth so that unwanted noises can be reduced.

The groove 24 has a first action surface 24A which extends in a direction outward from the axis 21A of rotation (direction away from the axis 21A of rotation) and which constitutes a right (in the drawing) side wall of the groove 24, and an opposed surface 24B which faces the first action surface 24A. It also extends substantially in a direction outward from the axis 21A of rotation.

At the right side of the first action surface 24A, a second action surface 25 is provided, which extends continuously with the first action surface 24A. The second action surface 25 extends in a direction following a circumference of a circle drawn around the axis 21A of rotation, as viewed in the direction of the axis 21A of rotation. To be more specific, as shown in FIG. 2(b), the second action surface 25 is positioned such that a direction from the surface toward a center of curvature thereof (see an arrow in FIG. 2(b)) is shifted to the right (rightward of the axis 21A of rotation when viewed from the surface toward the axis 21A of rotation). This shift equally applies throughout the whole range of its contact with a contact surface 33A of an operating arm 33, that is, that whole range is shifted to the right. As appreciated from this mode of shift, the second action surface 25 is configured such that a surface position closer to its end in the counterclockwise direction (surface at the right upper position in the drawing) is distanced farther from the axis 21A of rotation.

As shown in FIG. 4, the bearing portion 26 has a size in its axial direction (direction of the axis 21A of rotation) greater than those of portions which form the first action surface 24A, the second action surface 25 and the arm 22. Accordingly, the rigidity of the bearing portion 26 can be ensured sufficiently, and the portions corresponding to the first action surface 24A and the second action surface 25 can be made lighter in weight, so that the weight as a whole can be reduced. It is understood that the first action surface 24A and the second action surface 25 each have a width (the size in the direction of the axis 21A of rotation) sufficient to avoid an excessive surface pressure which would be applied when sliding in contact with the second link 30. With this configuration, even with repeated operations, deformation and wear of the first action surface 24A and the second action surface 25 can be suppressed.

Moreover, the back sides of the first action surface 24A and the second action surface 25, and at the back side of the opposed surface 24B are configured as trimmed portions 28. With this configuration, the first link 20 can be made lighter in weight, and a sink which would appear in portions corresponding to the first action surface 24A, the second action surface 25 and the opposed surface 24B due to shrinkage during the molding process can be prevented, so that the first action surface 24A, the second action surface 25 and the opposed surface 24B can be formed with high accuracy.

The second link 30 is supported at the base member 10 by caulking with a rivet 31. Accordingly, the second link 30 is rotatable about an axis 31A of rotation that is parallel to the axis 21A of rotation. The second link 30 includes, as seen in FIG. 2(a), a main body arm 32 extending rightward from the axis 31A of rotation, and an operating arm 33 extending upward from a portion near the right end of the main body arm 32. The operating arm 33 has an elongated shape, and is configured to have its distal end disposed in the groove 24 in a state before the pulling operation made by the wire 70 as shown in FIG. 2(a). In the position before actuation as shown in FIG. 2(a), a sufficient clearance is provided between the distal end of the operating arm 33 and the bottom of the groove 24, and thus the first link 20 and the second link 30 are prevented from getting stuck by contact of the operating arm 33 and the bottom of the groove 24. An end of the left side of the distal end portion of the operating arm 33 is disposed to face the first action surface 24A before the pulling operation made by the wire 70, and constitutes the contact surface 33A which is brought into contact with the first link 20 at a time of the pulling operation made by the wire 70. At the distal end portion of the operating arm 33, a pin 34 is press-fitted therein. The pin 34 protrudes frontward of the drawing sheet in FIG. 2(a), and a left end (first end portion) of a tension spring 60 as one example of a biasing member is hooked thereon.

Figure 3:
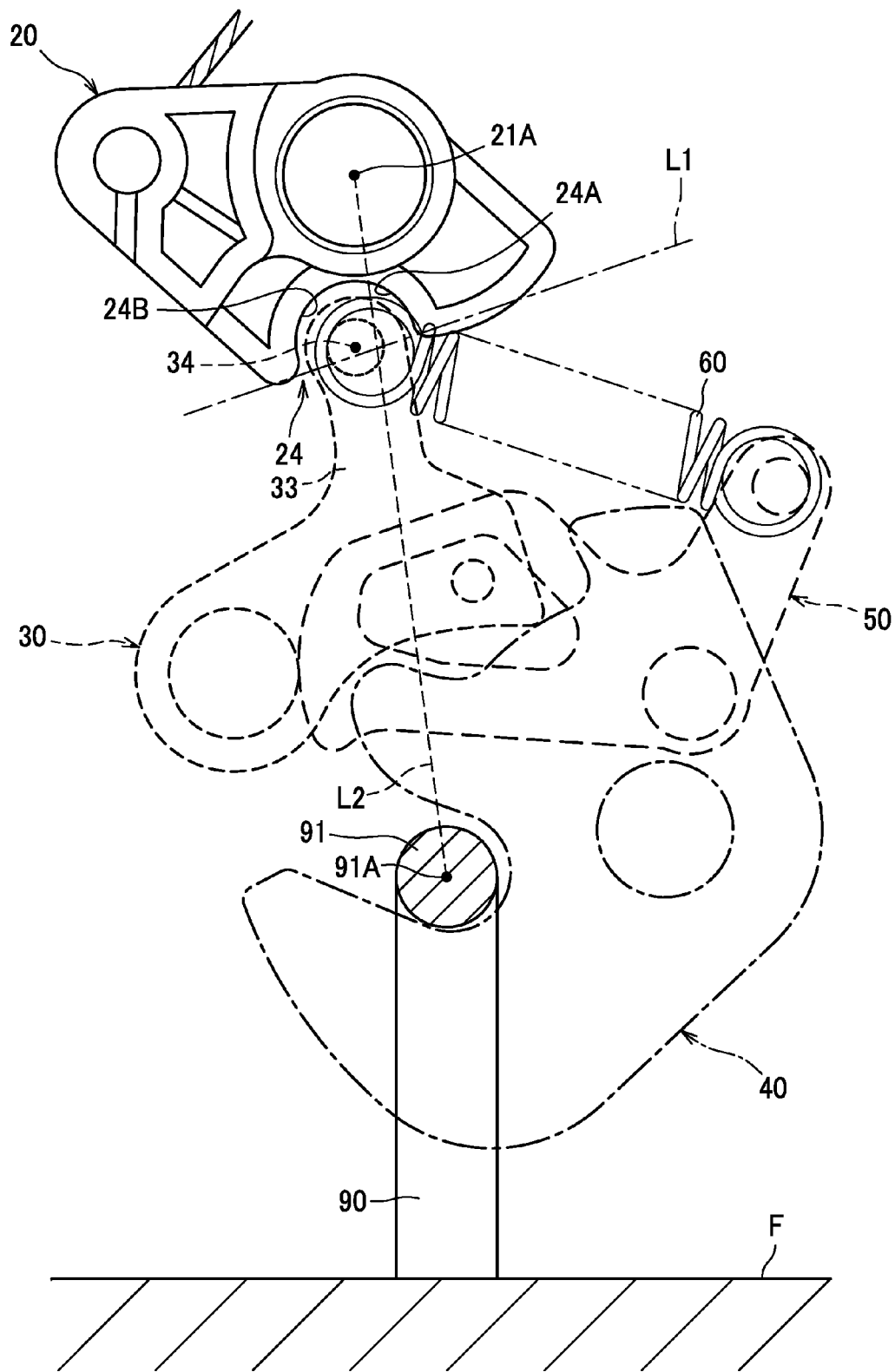
FIG. 3 is an enlarged view of a part of FIG. 2(a) for explaining arrangement of several elements of the latching device in the locked state.

The pin 34 is configured such that before the pulling operation made by the wire 70 an axis 34A thereof is located, as shown in FIG. 3, at an inside of the groove 24 as defined with respect to a straight line L1 that connects ends of the opposed surface 24B and the first action surface 24A which ends define edges of the groove 24 of the first link 20. With this configuration, in the latching device 1, the biasing force of the tension spring 60 applied to the pin 34 is transmitted efficiently to the first action surface 24A (first link 20) when it is actuated. This arrangement also contributes to miniaturization of the latching device 1 as a whole.

The lower end of the right end portion of the main body arm 32 protrudes downward to some extent, so as to provide a lock engaging portion 35 configured to maintain the locked state of the latch 40 by engaging in a lock recessed portion 44 of the latch 40 which will be described later. In the main body arm 32, a portion slightly closer to the axis 31A of rotation than the lock engaging portion 35 has a pin 36 press-fitted therein. The pin 36 protrudes frontward of the drawing sheet in FIG. 2(a).

The latch 40 is a member configured to engage with the rod-like portion 91 of the striker 90 to establish a locked state of the latching device 1. The latch 40 is supported at the base member 10 by caulking with a rivet 41. With this, the latch 40 is rendered rotatable about an axis 41A of rotation that is parallel to the axis 21A of rotation.

The latch 40 has an engageable groove 42 provided at its left side which engageable groove 42 opens to the left in the posture shown in FIG. 2(a). The lower side of the engageable groove 42 forms a hook-like portion 43 which holds the rod-like portion 91 in the locked state to restrain the latching device 1 from coming off upwardly. The latch 40 has an upwardly protuberant shape, with its upper end portion having a lock recessed portion 44 and an open contact surface 45 provided at the right side of, and continuously with, the lock recessed portion 44.

In the lock recessed portion 44, the lock engaging portion 35 of the second link 30 is engaged before actuation as shown in FIG. 2(a).

The open contact surface 45 is formed so as to follow an arc of a circle whose normal is directed substantially toward the axis 41A of rotation. To be more specific, the direction of this normal is shifted leftward to some extent from the axis 41A of rotation.

The actuating lever 50 is an example of a transmission mechanism configured to transmit a rotational motion of the second link 30 to the latch and, to cause the latch to make a rotational motion. The actuating lever 50 is supported at the latch 40 by caulking with a rivet 51. Accordingly, the actuating lever 50 is rotatable about an axis 51A of rotation that is parallel to the axis 21A of rotation. The actuating lever 50 includes a main body portion 52 extending leftward of the axis 51A of rotation, and an arm 53 extending upward. At the distal end portion of the arm 53, a pin 54 is press-fitted therein. The pin 54 protrudes frontward of the drawing sheet in FIG. 2(a), and a right end (second end portion) of the tension spring 60 is hooked thereon.

The main body portion 52 of the actuating lever 50 has a guide hole 55 shaped generally like a triangle with a vertex provided at an upper position. At the guide hole 55, the aforementioned pin 36 of the second link 30 is engaged therein. The lower left end portion of the main body portion 52 protrudes downward to some extent. This protruding portion is a restriction portion 56 which is configured to come in contact with the rivet 31 when the latch 40 is released, to determine the position of the actuating lever 50.

In the latching device 1 described above, the first action surface 24A of the first link 20 is provided to cover a range sufficient to release the latch 40, and the second action surface 25 is provided so as not to release the latch 40 from the locked state but to ensure the pull length allowance of the wire 70. In other words, the first action surface 24A and the second action surface 25 are formed such that when the latch 40 is released from the locked state, the time of switching the surface of the first link 20 in contact with the contact surface 33A of the second link 30 through rotation of the first link 20 from the first action surface 24A to the second action surface 25 comes after the lock engaging portion 35 moves off the lock recessed portion 44 and faces the open contact surface 45.

In the state before the pulling operation made by the wire 70 as shown in FIG. 2(a) and FIG. 3, the first link 20 and the tension spring 60 are located in such positions that one extends over a part of another with respect to the upward-downward direction (direction in which the base member 1 disengages from the rod-like portion 91 of the striker 90). With this configuration, the downsizing of the latching device 1 in the upward-downward direction can be achieved.

Furthermore, as shown in FIG. 3, the groove 24 of the first link 20 is located so as to extend over a straight line L2 that connects an axis 91A of the rod-like member 91 and the axis 21A of rotation of the first link 20. Moreover, the first end portion (left end portion engaged with the operating arm 33) of the tension spring 60 is located in a position shifted from the second end portion (right end portion engaged with the actuating lever 50) thereof in the upward direction (direction in which the base member 1 disengages from the rod-like portion 91 of the striker 90). These features contribute respectively to the downsizing, particularly in the leftward-rightward direction, of the latching device 1.

Operation of the latching device 1 configured as described above will now be described.

In the state before actuation as shown in FIG. 2(a), the rod-like portion 91 of the striker 90 is located in the deepest of the groove 12, and the hook-like portion 43 of the latch 40 holds the rod-like portion 91 from below. The actuating lever 50 has a distal end thereof brought into contact with the rivet 31 and is thus restrained from rotating counterclockwise, whereby the latch 40 is restrained from rotating in a counterclockwise direction that is a direction in which the latch 40 would open. Moreover, the tension spring 60 produces a pulling force, and the lock engaging portion 35 of the second link 30 is in contact with the bottom of the lock recessed portion 44.

Figure 5:
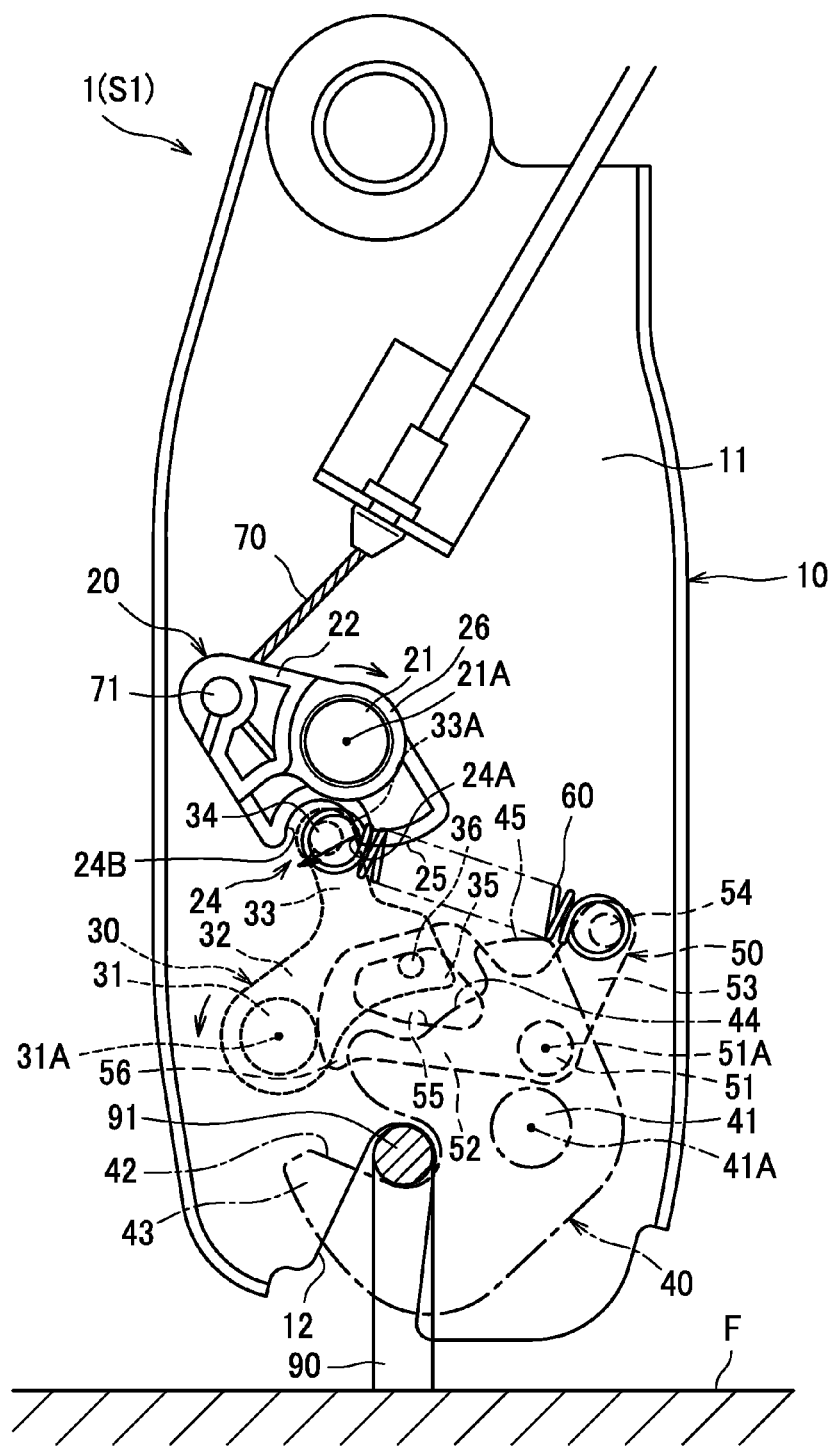
FIG. 5 is a diagram showing a state in which a first action surface causes an operating arm to rotate in response to a small amount of pulling operation of a wire.

From the state before actuation as shown in FIG. 2(a), when the wire 70 is pulled, the latching device 1 is actuated as shown in FIG. 5 in such a manner that, at first, the first link 20 rotates clockwise, and the first action surface 24A of the first link 20 pushes the right contact surface 33A of the operating arm 33, causing the second link 20 to rotate counterclockwise. As the second link 30 rotates counterclockwise, the pin 36 pushes the left upper edge of the inside of the guide hole 55, and causes actuating lever 50 to rotate clockwise while expanding the tension spring 60. Although, in FIG. 5, very little change appears from FIG. 2(a), the force applied to the actuating lever 50 tends to cause, via the rivet 51, the latch 40 to gradually rotate counterclockwise.

During this operation, the rotation of the first link 20 efficiently causes the second link 30 to rotate because the first action surface 24A extends in a direction outward from the axis 21A of rotation of the first link 20. In other words, the angle of rotation of the second axis of the second link 30 is relatively greater than the angle of rotation of the first link 20.

When the wire 70 is further pulled, the first action surface 24A of the first link 20 further pushes the contact surface 33A of the second link 30, causing the second link 30 to rotate counterclockwise to a large extent. When a predetermined amount of pulling operation made by the wire 70 causes the second link 30 to rotate through a predetermined angle, the operating arm 33 disengages from the groove 24A as shown in FIG. 6 so that the surface of the first link 20 in contact with the contact surface 33A is switched from the first action surface 24A to the second action surface 25. The second action surface 25 is in a position shifted from an arc of the circle drawn around the axis 21A of rotation so that the distance of its position from the axis 21A of rotation becomes greater toward an end advancing farther in a counterclockwise direction; therefore, as the wire 70 is pulled, the second action surface 25 pushes the contact surface 33A, and causes the second link 30 to slightly rotate counterclockwise. However, since the second action surface 25 extends in a direction substantially following a circumference of a circle drawn around the axis 21A of rotation, the amount of rotation of the second link 30 is very small, and it is appreciated that it appears that the first link 20 rotates but almost as if it only skids without effect. In other words, when the second action surface 25 pushes the contact surface 33A, the amount of rotation of the second link 30 associated with the amount of rotation of the first link is much smaller, compared with the period for which the first action surface 24A pushes the contact surface 33A. The counterclockwise rotation of the second link 30, similar to the preceding operation, causes the actuating lever 50 to rotate clockwise, and causes the latch 40 to rotate counterclockwise so as to gradually open. Moreover, a great amount of the counterclockwise rotation of the second link 30 results in separation of the lock engaging portion 35 from the lock recessed portion 44, and a small amount of counterclockwise rotation of the second link 30 causes the lower edge of the second link 30 closer than the lock engaging portion 35 to the axis 31A of rotation to face the open contact surface 45.

As shown in FIG. 6, in the state before the pulling operation made by the wire 70, the second action surface 25 of the first link 20 and the tension spring 60 are located in such positions that one extends over another as viewed in a direction of the axis 21A of rotation of the first link; thus, the latching device 1 can be designed to be compact in size in an upward-downward direction.

Figure 7:
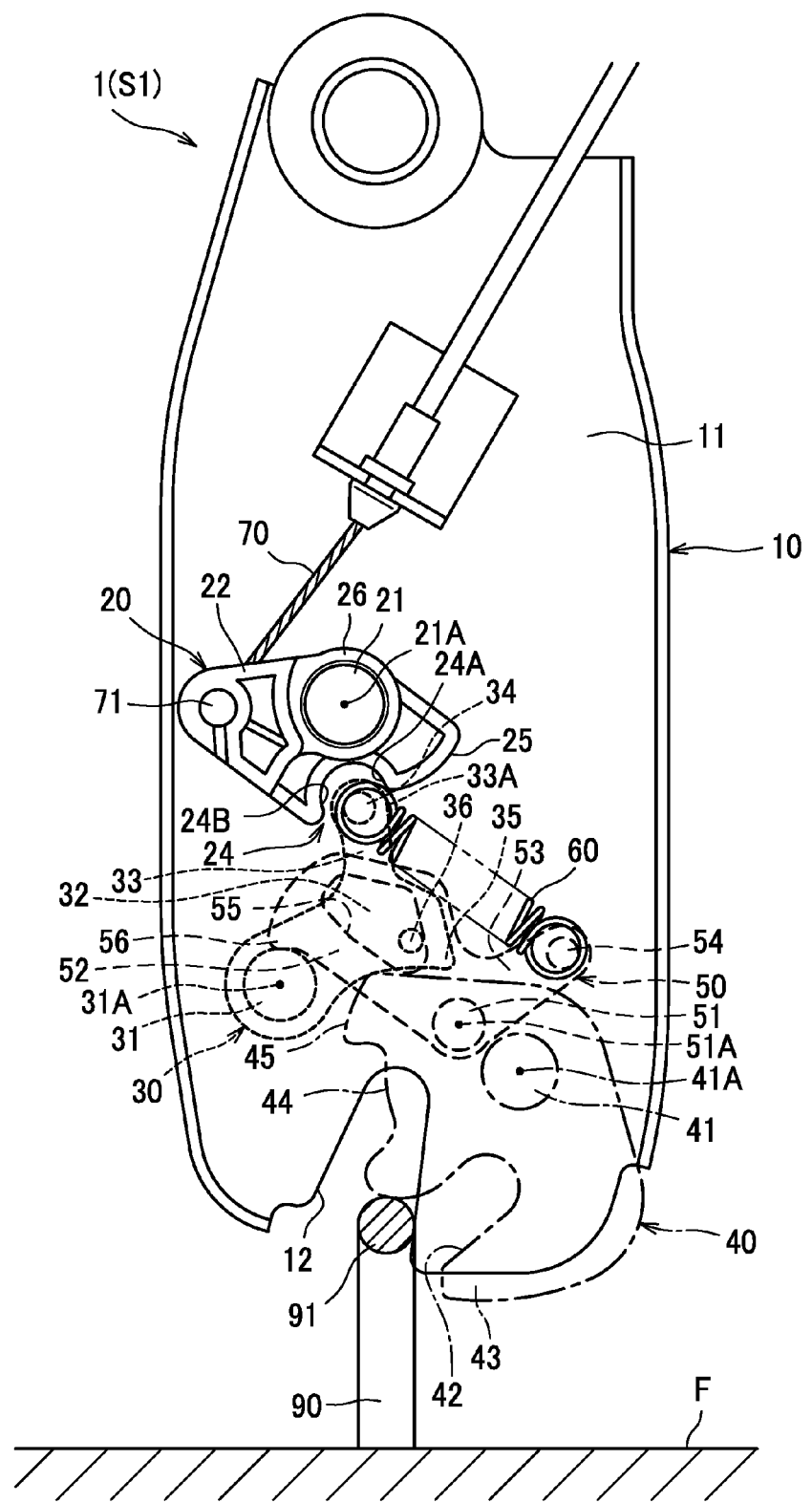
FIG. 7 is a diagram showing a state in which the wire is back with the latch being open.

From the state shown in FIG. 6, when the wire 70 moves back by the action of the pulling force of the tension spring 60, the lower edge of the second link 30 contacts and pushes the open contact surface 45 of the latch 40, causing the latch 40 to rotate counterclockwise to a large extent, as shown in FIG. 7. The latch 40 is then brought into contact with the edge of the base member 10 and thereby restrained from rotating further in its open position. As a result, the rod-like portion 91 of the striker 90 completely disengages from the latching device 1 and becomes free.

Figure 8:
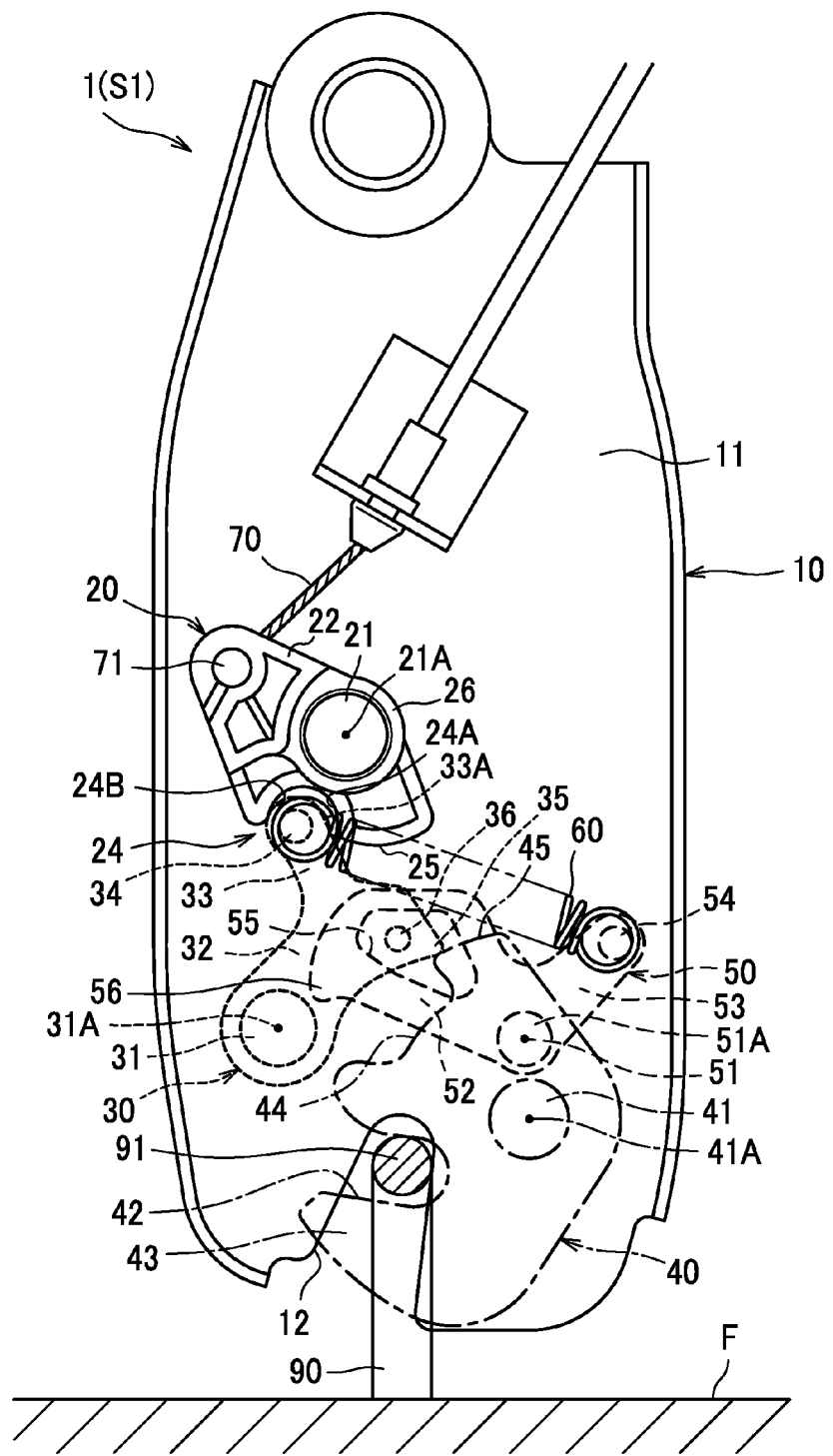
FIG. 8 is a diagram showing a state in which a striker pushes the latch and causes the latch to start closing.

When the striker 90 is engaged with the latching device 1, starting from the state shown in FIG. 7, the rod-like portion 91 is pressed against the engageable groove 42 of the latch 40 in the open state, in any way such as pushing down the vehicle seat S or the like. Then, the latch 40 is caused to rotate clockwise, and the open contact surface 45 slides on the lower edge of the second link 30 as shown in FIG. 8. In this operation, the second link 30 slightly rotates counterclockwise, and the operating arm 33 is brought into contact with the opposed surface 24B of the first link 20, and causes the first link 20 to rotate counterclockwise to some extent. When the rod-like portion 91 is, from the state shown in FIG. 8, further pressed against the engageable groove 42, the lock engaging portion 35 is engaged with the lock recessed portion 44, namely, back to the state shown in FIG. 2(a).

According to the latching device 1 of the present embodiment as described above, at the initial stage of the pulling operation of the wire 70, the first action surface 24A of the first link 20 pushes the contact surface 33A of the second link 30, so that a rotational motion of the second link 30 necessary for opening the latch 40 can be performed efficiently. Moreover, after the second link 30 is rotated to an extent sufficient to open the latch 40, the surface of the first link 20 in contact with the contact surface 33A of the second link is switched from the first action surface 24A to the second action surface 25 so that the rotatable angle of the first link 20 is made greater, whereby the length of the wire 70 which can be pulled is increased, and thus the pull length allowance can be increased.

Since the latching device 1 is configured such that a direction from a utilized area of the second action surface 25 toward the center of curvature of the second action surface 25 is shifted to the right side in the drawing figure with respect to the axis 21A of rotation, the first link 20 can be moved back to its pre-actuated position by a force received by the second action surface 25 from the operating arm 33, that is, utilizing the pulling force of the tension spring 60; thus, even if a user abruptly moves back the wire 70 at a time partway during the operation, the risk of each link being stopped in an unexpected position is obviated and the pre-actuated state can be restored.

Since the latching device 1 is configured to include the opposed surface 24B which faces the first action surface 24A, the play between the first link 20 and the second link 30 is small, and thus the noises can be reduced. Moreover, when the second link 30 tends to restore to its pre-actuated position, the first link 20 can be driven to move back to its pre-actuated position.

Although the embodiment of the present invention has been described above, the present invention is not limited to the above-described embodiment, and the present invention can be implemented appropriately in a modified form without limitation to the above-described embodiment.

For example, in the above-described embodiment, the wire 70 is illustrated as an example of the pull member, but the pull member may be configured as a rod.

Although the actuating lever 50 is illustrated as an example of the transmission mechanism, the transmission mechanism may be implemented by adopting any other mechanism known in the art.

Furthermore, the latching device 1 is not limited to an embodiment in which it is adopted in the leg S1 of the vehicle seat S such as a car, but may be provided in a seat bottom or a seat back of the vehicle seat S, or may be used as a device for locking an closable opening of a trunk of the car. In this respect, the base member 10 is not limited to the leg S1 of the vehicle seat S, but may be an appropriate member configured according to the device to which the latching device 1 is applied. Also, the vehicle seat S may be a seat for a ship or for an aircraft other than a car.

The invention claimed is:

1. A latching device capable of disengaging from a rod-like portion in response to a pulling operation by a pull member, the latching device comprising:
   a base member;
   a first link which is supported at the base member in a rotatable manner and of which a rotational motion is imparted by the pull member;
   a second link which is supported at the base member in a manner that permits the second link to rotate about an axis parallel to an axis of rotation of the first link;
   a latch including a hook-like portion engageable with the rod-like portion; and
   a transmission mechanism configured to transmit a rotational motion of the second link to the latch and, to cause the latch to make a rotational motion,
   wherein the first link has a first action surface and a second action surface,
   wherein the second link has a contact surface disposed to face the first action surface before the pulling operation made by the pull member, and
   wherein the pulling operation made by the pull member causes the first action surface to push the contact surface, causing the second link to make a rotational motion, and causes a surface of the first link in contact with the second link to be switched, partway through the pulling operation made by the pull member, from the first action surface to the second action surface.

2. The latching device according to claim 1, wherein the first action surface extends in a direction away from the axis of rotation of the first link, and the second action surface is provided continuously with the first action surface and extends in a direction following a circumference of a circle drawn around the axis of rotation of the first link.

3. The latching device according to claim 1, further comprising a biasing member configured to bias the second link,
   wherein a direction from the second action surface toward a center of curvature of the second action surface is shifted to one side with respect to the axis of rotation, whereby a force received by the second action surface from the second link biased by the biasing member acts as a force which drives the first link to rotate toward a position in which the first link has been located before the pulling operation made by the pull member.

4. The latching device according to claim 1, wherein the first link has an opposed surface which faces the first action surface, and has a groove made by the first action surface and the opposed surface,
   wherein the second link includes an operating arm having the contact surface, and
   the operating arm is configured to be in the groove before the pulling operation made by the pull member, and to disengage from the groove after a predetermined amount of the pulling operation made for the pull member.

5. The latching device according to claim 1, wherein the first link is made of resin.

6. The latching device according to claim 5, wherein back sides of the first action surface and the second action surface are trimmed.

7. The latching device according to claim 1, wherein the first link has a bearing hole at which the rotational motion of the first link is supported, and a bearing portion surrounding the bearing hole has a size in an axial direction greater than those of portions which form the first action surface and the second action surface.

8. The latching device according to claim 4, further comprising a biasing member configured to bias the second link,
   wherein the operating arm includes a pin which is provided at an end thereof and with which one end of the biasing member is engaged, and before the pulling operation made by the pull member an axis of the pin is located, as viewed in a direction of the axis of rotation of the first link, at an inside of the groove with respect to a straight line that connects ends of the opposed surface and the first action surface which ends define edges of the groove.

9. The latching device according to claim 1, further comprising a biasing member configured to bias the second link,
   wherein before the pulling operation made by the pull member the first link and the biasing member are located in such positions that one extends over at least a part of another with respect to a direction in which the base member disengages from the rod-like portion.

10. The latching device according to claim 4, wherein before the pulling operation made by the pull member the groove is located so as to extend over a straight line that connects an axis of the rod-like member and the axis of rotation of the first link, as viewed in a direction of the axis of rotation of the first link.

11. The latching device according to claim 1, wherein the first link has a wire threading slot which allows the pull member to thread therethrough for engagement with the first link, and
   wherein before the pulling operation made by the pull member the wire threading slot is located to face a wall of the base member.

12. The latching device according to claim 4, further comprising a biasing member configured to bias the second link, the biasing member having a first end portion and a second end portion, the first end portion being engaged with the operating arm, the second end portion being engaged with the transmission mechanism,
   wherein before the pulling operation made by the pull member the first end portion is located in a position shifted from the second end portion toward a direction in which the base member disengages from the rod-like portion.

13. The latching device according to claim 1, further comprising a biasing member configured to bias the second link, wherein after the pulling operation made by the pull member the second action surface of the first link and the biasing member are located in such positions that one extends over another, as viewed in a direction of the axis of rotation of the first link.

14. The latching device according to claim 1, wherein the first action surface extends in a direction away from the axis of rotation of the first link, and the second action surface is provided continuously with the first action surface, wherein a length of the second action surface in a direction of a circumference of a circle drawn around the axis of rotation of the first link is longer than half of a length of a portion of the second link which is contactable with the first link in a direction of a circle drawn around the axis of rotation of the first link, the second action surface extending from the first action surface in such a direction as to gradually become more distant from the axis of rotation of the first link, and wherein the rotational motion of the first link causes the second link to slide along the length of the second action surface.

15. The latching device according to claim 1, wherein the first link has a groove recessed in a profile thereof as viewed from a direction of the axis of rotation of the first link, the first action surface being formed inside the groove and extending in a direction away from the axis of rotation of the first link to an open end of the groove, and the second action surface is provided continuously with the first action surface, the second action surface extending from the first action surface, away from the groove, in such a direction as to gradually become more distant from the axis of rotation of the first link.

16. The latching device according to claim 2, wherein the second action surface has a curved form which bulges outward.

* * * * *